US010565077B2

(12) United States Patent
Hayden et al.

(10) Patent No.: US 10,565,077 B2
(45) Date of Patent: Feb. 18, 2020

(54) USING COGNITIVE TECHNOLOGIES TO IDENTIFY AND RESOLVE ISSUES IN A DISTRIBUTED INFRASTRUCTURE

(71) Applicant: International Business Machines Corporation, Armonk, NY (US)

(72) Inventors: Clifford Hayden, Needham, MA (US); William G. O'Keeffe, Boulder City, NV (US); Pankaj Sabharwal, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 15/826,107

(22) Filed: Nov. 29, 2017

(65) Prior Publication Data
US 2019/0163594 A1 May 30, 2019

(51) Int. Cl.
*G06F 11/00* (2006.01)
*G06F 11/22* (2006.01)
(Continued)

(52) U.S. Cl.
CPC ...... *G06F 11/2257* (2013.01); *G06F 11/3024* (2013.01); *G06F 11/3495* (2013.01); *G06N 20/00* (2019.01)

(58) Field of Classification Search
CPC .............. G06F 11/079; G06F 11/2257; G06F 11/3006; G06F 11/3024; G06F 11/3495
See application file for complete search history.

(56) References Cited

U.S. PATENT DOCUMENTS 5,463,768 A * 10/1995 Cuddihy ............. G06F 11/2205
714/37
6,598,179 B1 * 7/2003 Chirashnya ........... G06F 11/079
714/19
(Continued)

OTHER PUBLICATIONS

Alspaugh, S. et al., "Analyzing Log Analysis: An Empirical Study of User Log Mining", Proceeding LISA'14 Proceedings of the 28th USENIX conference on Large Installation System Administration, Nov. 9-14, 2014, 16 pages.
(Continued)

*Primary Examiner* — Joshua P Lottich
(74) *Attorney, Agent, or Firm* — Stephen R. Tkacs; Stephen J. Walder, Jr.; Ryan G. Lewis

(57) ABSTRACT

A mechanism is provided in a data processing system for identifying and resolving issues in a distributed infrastructure. A log error processor monitors error logs of a plurality of data processing nodes within the distributed infrastructure. In response to the log error processor detecting an error in a given node within the distributed infrastructure, the log error processor provides error data for the error to the machine learning model and receiving from the machine learning model a set of potential solutions and associated confidence values. An operation extraction component extracts from each potential solution in the set of potential solutions a set of operations to resolve the error. A classifier component maps each set of operations to a set of executable operations that are executable by the given node. A solution scorer component determines whether to perform automatic resolution using a selected potential solution and its corresponding set of executable operations. In response to the solution scorer component determining to perform automatic resolution, an operation execution engine executes the corresponding set of executable operations on the given node.

20 Claims, 9 Drawing Sheets

(51) Int. Cl.
    *G06F 11/34*     (2006.01)
    *G06F 11/30*     (2006.01)
    *G06N 20/00*     (2019.01)

(56) References Cited

U.S. PATENT DOCUMENTS

| | | | |
|---|---|---|---|
| 7,266,726 B1 * | 9/2007 | Ladd | G06F 11/2268 |
| | | | 714/27 |
| 8,671,085 B2 | 3/2014 | Dhamankar et al. | |
| 9,483,334 B2 | 11/2016 | Walsh | |
| 9,798,607 B1 * | 10/2017 | Kulkarni | G06F 11/0778 |
| 2011/0154117 A1 * | 6/2011 | Danielson | G06F 11/0748 |
| | | | 714/37 |
| 2013/0151494 A1 | 6/2013 | Dhamankar et al. | |
| 2014/0081875 A1 | 3/2014 | Pierson et al. | |
| 2014/0201145 A1 | 7/2014 | Dorman et al. | |
| 2014/0214745 A1 | 7/2014 | Walsh | |
| 2014/0222521 A1 | 8/2014 | Chait | |
| 2014/0222522 A1 | 8/2014 | Chait | |
| 2017/0091019 A1 * | 3/2017 | Li | G06F 11/0709 |

OTHER PUBLICATIONS

Beszedes, Arpad et al., "Predicting Critical Problems from Execution Logs of a Large-Scale Software System", Department of Software Engineering, University of Szeged, 2010, 12 pages.

* cited by examiner

| DOCUMENT ID | ERROR DESCRIPTION | LOG FILE SNIPPETS | RESOLUTION TEXT | INTERESTED PARTIES |
|---|---|---|---|---|
| 0001 | User is able to log in, but after an extended wait, is presented with a 500 error | SQL error 30082-SQL30082N Security processing failed with reason "1" | DB2 password expired, password must be changed | John Adams |

| ID | AN APP | ANOTHER APP | A NODE | AN ERROR | ... | SOLUTION DOCUMENT ID |
|---|---|---|---|---|---|---|
| 0001 | 1 | 0 | 0 | 0 | ... | 0010 |
| 0002 | 0 | 1 | 0 | 0 | ... | 0010 |
| 0003 | 1 | 0 | 1 | 1 | ... | 0011 |
| 0004 | 1 | 0 | 1 | 1 | ... | 0012 |

*FIG. 8*

| PHRASES | OPERATION ID |
|---|---|
| • SSH to node<br>• Connect to node<br>• Log into node<br>• Open terminal on node | 001 |
| • Restart node<br>• Bounce node<br>• Reboot node | 002 |
| • Install fixpack 1<br>• Add fixpack 1 to server<br>• Perform fixpack 1 install | 003 |

*FIG. 9*

| OPERATION ID | COMMAND LIST |
|---|---|
| 001 | ssh node -l admin |
| 002 | # reboot |
| 003 | cd server_location<br>cp /fixpacks/fixpack1<br>cd bin<br>./stopserver.sh<br>cd ../fixpack1<br>./install_fixpack_1.sh<br>cd ../bin<br>./startserver.sh |

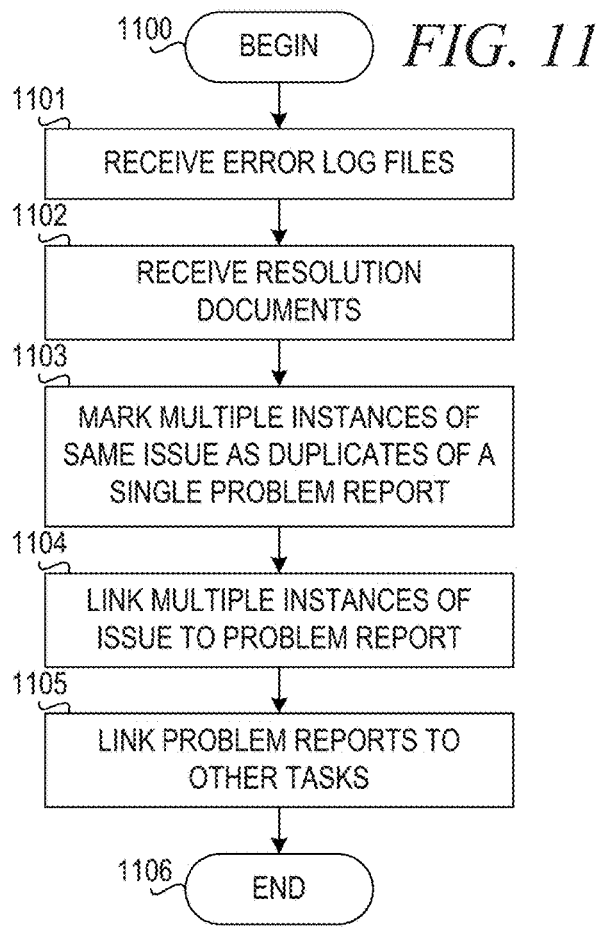

*FIG. 11*

USING COGNITIVE TECHNOLOGIES TO IDENTIFY AND RESOLVE ISSUES IN A DISTRIBUTED INFRASTRUCTURE

BACKGROUND

The present application relates generally to an improved data processing apparatus and method and more specifically to mechanisms for using cognitive technologies to identify and resolve issues in a distributed infrastructure.

Cloud computing is an information technology (IT) paradigm for enabling ubiquitous access to shared pools of configurable resources (such as computer networks, servers, storage, applications and services). Which can be rapidly provisioned with minimal management effort, often over the Internet. Cloud computing allows users and enterprises with various computing capabilities to store and process data either in a privately-owned cloud, or on a third-party server located in a data center, thus making data-accessing mechanisms more efficient and reliable. Cloud computing relies on sharing of resources to achieve coherence and economy of scale, similar to a utility.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system comprising at least one processor and a memory comprising instructions, for identifying and resolving issues in a distributed infrastructure. The method comprises configuring the memory with instructions, which are executed by the at least one processor and configure the at least one processor to implement a log error processor, a machine learning model, an operation extraction component, a classifier component, a solution scorer component, and an operation execution engine. The method further comprises monitoring, by the log error processor, error logs of a plurality of data processing nodes within the distributed infrastructure. In response to the log error processor detecting an error in a given node within the distributed infrastructure, the method further comprises the log error processor providing error data for the error to the machine learning model and receiving from the machine learning model a set of potential solutions and associated confidence values. The method further comprises extracting, by the operation extraction component from each potential solution in the set of potential solutions, a set of operations to resolve the error. The method further comprises mapping, by the classifier component, each set of operations to a set of executable operations that are executable by the given node. The method further comprises determining, by the solution scorer component, whether to perform automatic resolution using a selected potential solution and its corresponding set of executable operations. In response to the solution scorer component determining to perform automatic resolution, the operation execution engine executes the corresponding set of executable operations on the given node.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 8 depicts a table for a classifier in accordance with an illustrative embodiment;

FIG. 9 depicts a table for system operation mappings in accordance with an illustrative embodiment;

FIG. 11 is a flowchart illustrating operation of a mechanism for preparing data sources in accordance with an illustrative embodiment;

DETAILED DESCRIPTION

Figure 1:
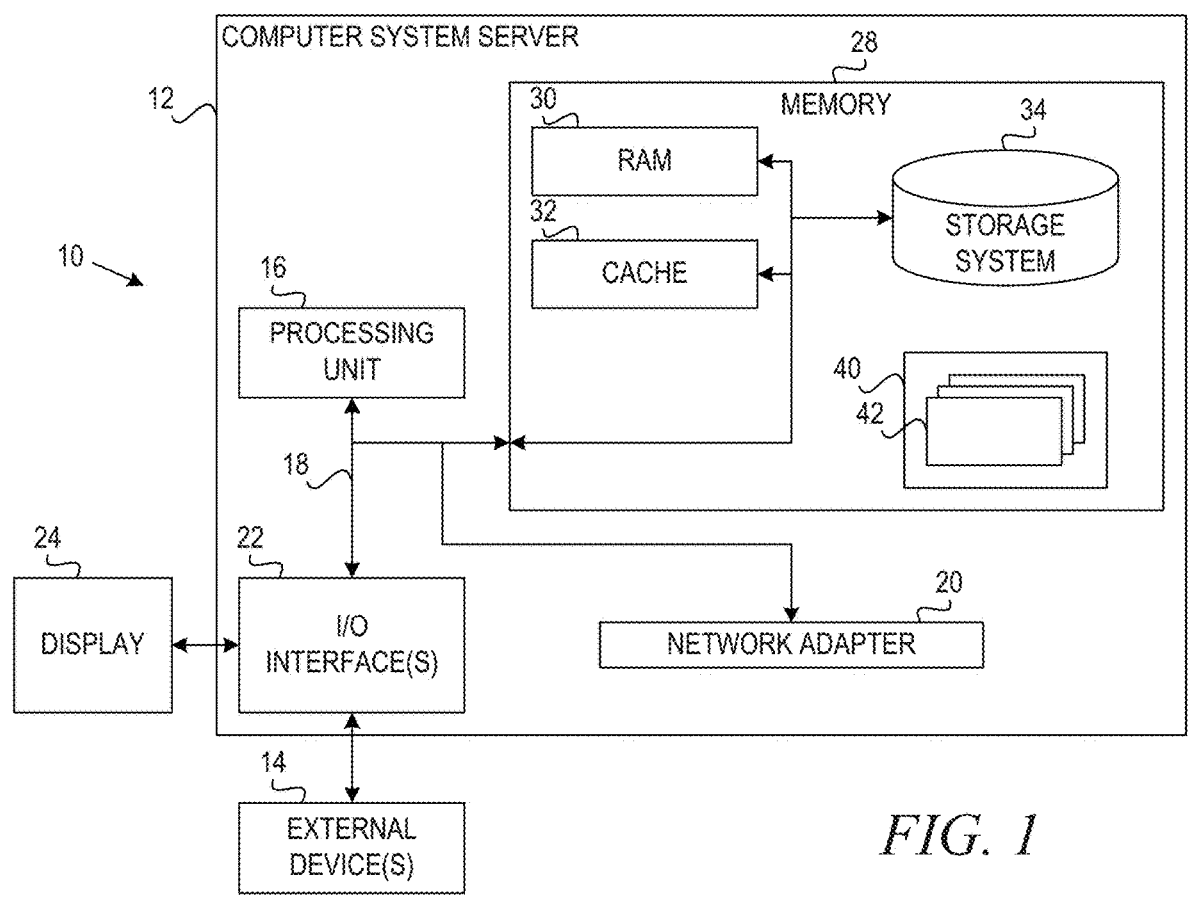
FIG. 1 depicts a cloud computing node according to an embodiment of the present invention.

Modern cloud architectures involve complex applications running over multiple distributed data centers. The current trend for cloud companies is to hire engineers across the globe to have continuous coverage. The primary focus of these engineers is to make sure the system is behaving as expected, which includes not only solving simple server issues but also being able to diagnose complex cross-system issues, which can take hours in some cases.

In the area of infrastructure management, a lot of work has been done in system monitoring, automated problem diagnosis, problem reporting, etc. In an era of cognitive computing, automation and artificial intelligence, far less work has been done on automatically resolving complex infrastructure issues.

The Illustrative embodiments provide a system that is capable of identifying both the footprint of issues experienced in the system and the steps needed to resolve those issues. The system is also capable of independently determining its own ability to resolve an identified problem and carrying out the steps needed to resolve the problem.

In large scale deployment environments, errors are meticulously logged using tracking software. From instances where a user reports an issue with the system to issues detected by log monitoring software, detailed descriptions of the system behavior when the error occurred, along with the errors from log files (and often the entire log file) are stored. Other artifacts may also be stored, such as screen captures of the error within a user interface, etc.

Once an issue is resolved, resolution documents are created containing the steps taken to resolve the issue, if a patch was applied, when and who applied the patch, etc. with the resolution document being linked to the original problem report. If multiple instances of the same issue are reported, they may be marked as duplicates of a single problem report, which may then be linked to the resolution document. Problem reports may be linked to other tasks as well, such as development tasks where a code change is needed to fix an issue, along with the developers involved, the testers who tested the fix, etc.

The illustrative embodiments mine this information to identify issues by way of monitoring the log files for a large distributed system, mapping the errors from the logs to potential solutions, and capturing them in procedure reports. The illustrative embodiments calculate confidence scores for these procedure reports, and if confidence is high enough (i.e., greater than a predetermined threshold), the steps may be automatically executed on the system. As procedures are automatically, executed and new issues are documented, the data feeds back into the system in a continuous feedback loop to continually improve the system.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism," Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by, remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
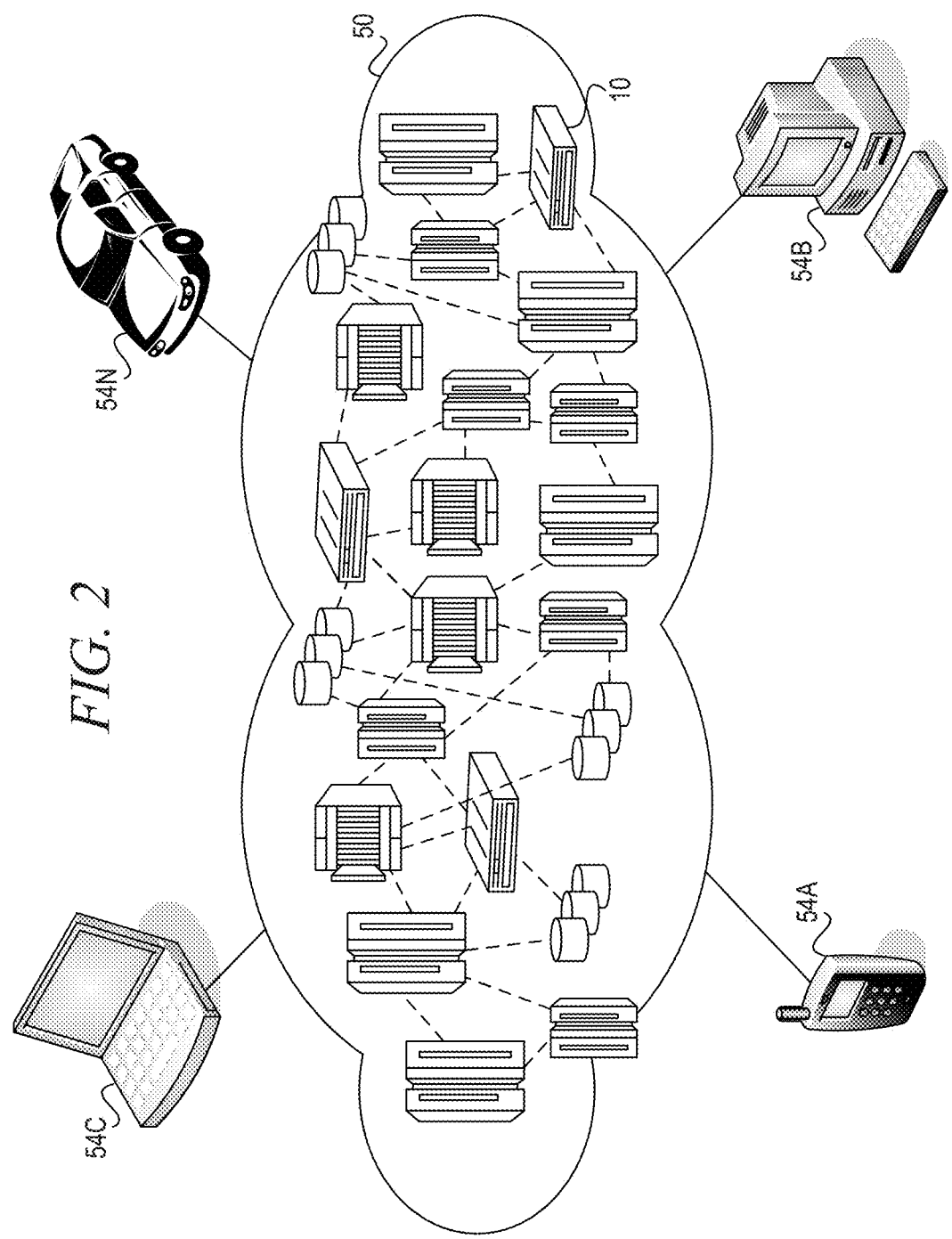
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
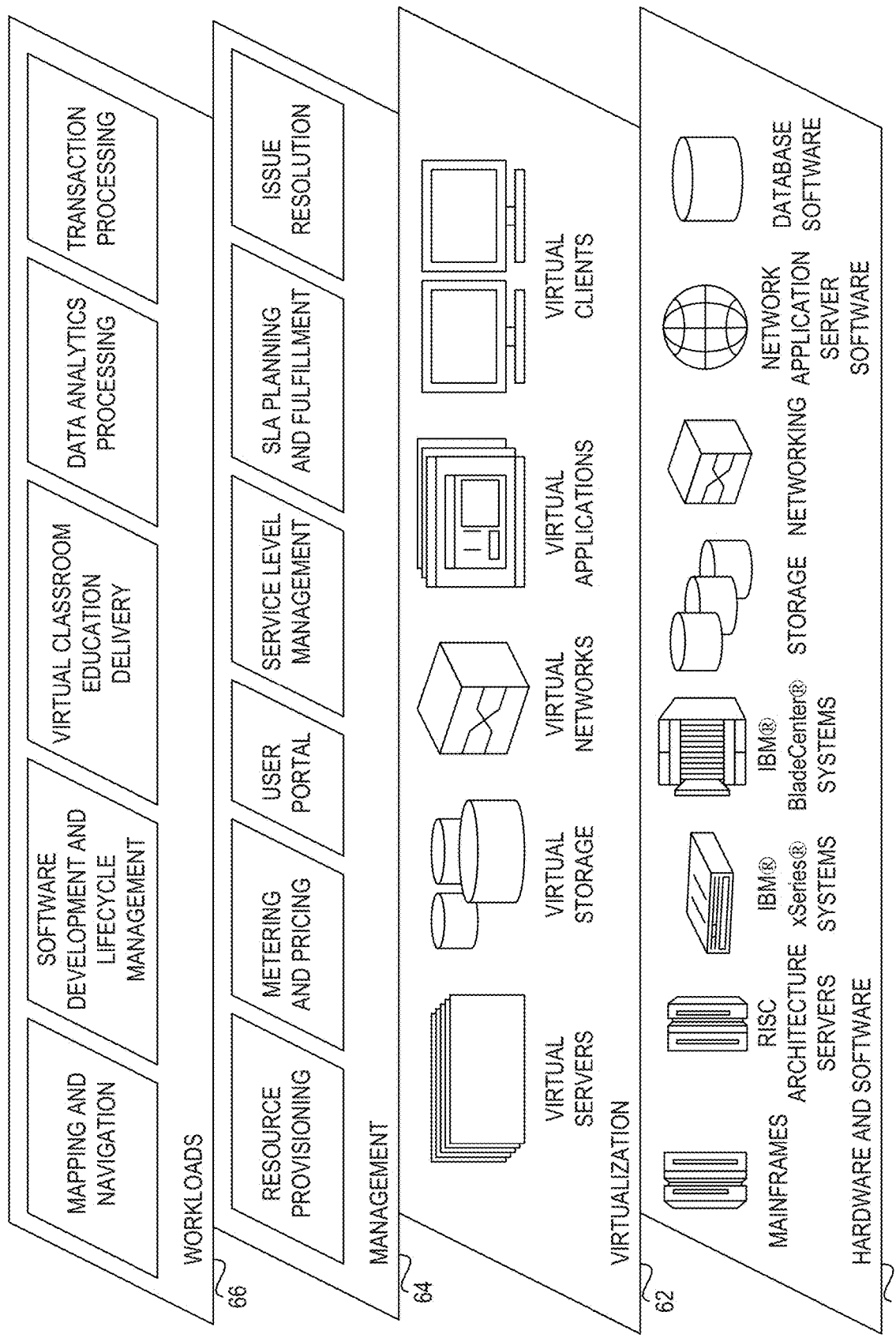
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

In management layer 64, issue resolution provides the ability to monitor log files, to map errors to potential solutions, and to capture the errors and solutions in procedure reports. Issue resolution calculates confidence scores for these procedure reports and, if confidence is high enough (i.e., greater than a predetermined threshold), automatically executes the procedure steps on the system.

Workloads layer 66 provides examples of functionality for which the cloud computing environment may be utilized. Examples of workloads and functions which may be provided from this layer include: snapping and navigation; software development and lifecycle management; virtual classroom education delivery; data analytics processing; and transaction processing.

Figure 4:
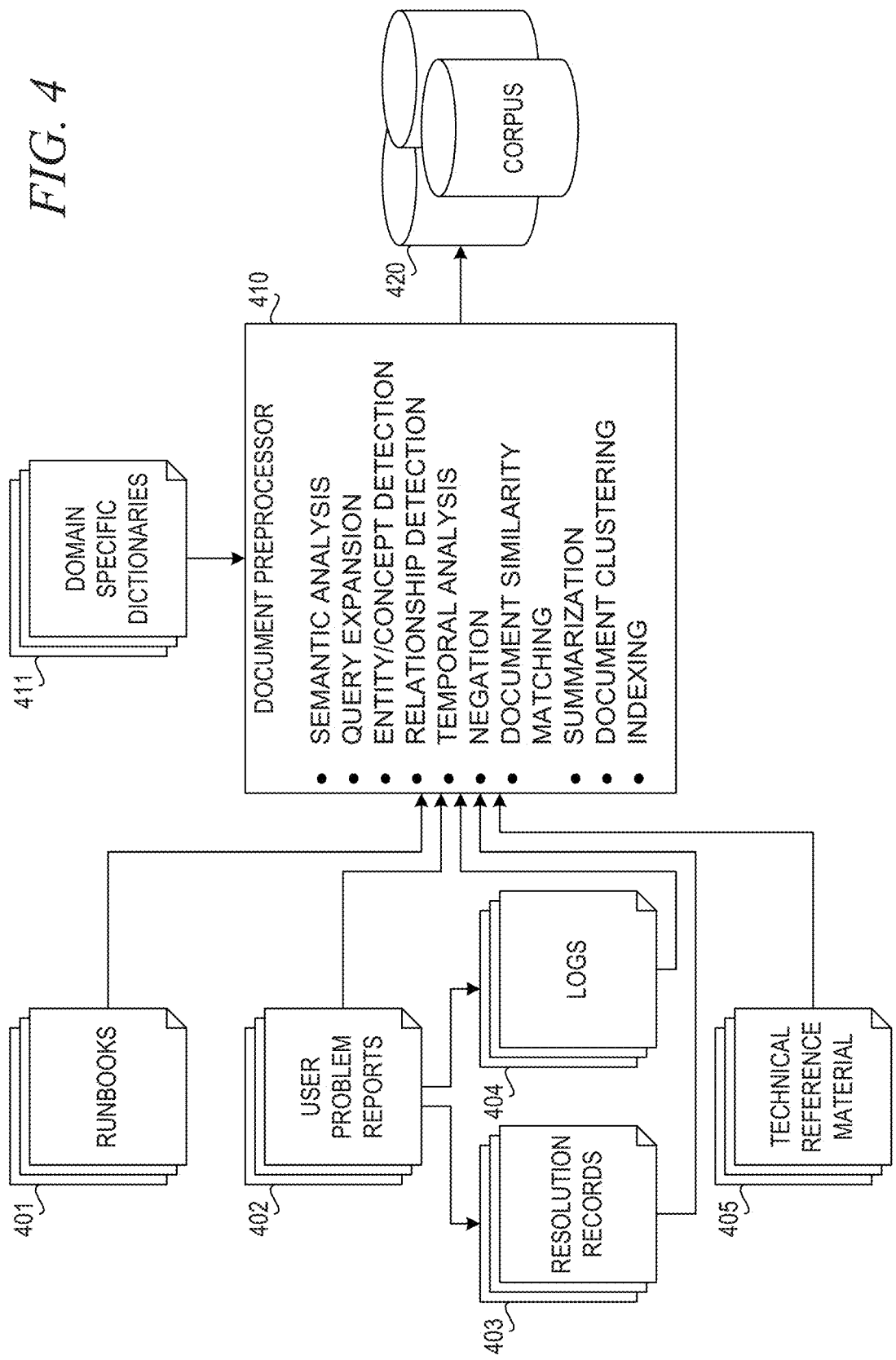
FIG. 4 is a block diagram of a system for creating a corpus for identifying and resolving issues in a distributed infrastructure using cognitive technologies in accordance with an illustrative embodiment.

FIG. 4 is a block diagram of a system for creating a corpus for identifying and resolving issues in a distributed infrastructure using cognitive technologies in accordance with an illustrative embodiment. Document preprocessor 410 receives data sources including runbooks 401, user problem reports 402, resolution records 403, error logs 404, and technical reference material 405. Problem reports 402, resolution documents 403, and error logs 404 are sources for the system, providing the user problem reports and linked error logs 404 and resolution document 403. Runbooks 401 are documents provided by the development team of an application running within the deployment environment. Runbooks 401 describe potential errors and their associated solutions. Technical reference material 405 may include user manuals for the application running in the environment or the servers hosting those applications.

The documents 401-405 from the various data sources are fed into document preprocessor 410. Document preprocessor 410 analyzes both the text of the ingested documents as well as the terms in a domain specific dictionary 411 to identify concepts and relationships. At a first step, document preprocessor 410 performs semantic analysis to identify the grammatical structure of the text, allowing the system to understand all possible interpretations of a given text string. Then, document preprocessor 410 performs query expansion, where individual terms within the text are expanded into their various surface forms.

Document preprocessor 410 performs concept/entity detection to identify relevant concepts within the text. This could be something as simple as the word "Error" to something more complex like "Server Authentication Failed." Concept detection in this case uses both the domain specific lexicon provided in domain specific dictionaries 411 as well as key phrases it identifies from the ingested documents themselves. The domain specific lexicon could also contain a list of server names, log names, etc. present in the environment.

Document preprocessor 410 performs relationship detection to identify relationships between the identified concepts/entities. For example, "node1.aserver.ibm.com" might have a relationship of "occurred_on_server" to a concept "db communications failed." Document preprocessor 410 then performs temporal analysis to identify date/time references within the documents and allow association with concepts. These can in turn be combined with dates provided with tracking software tickets, etc. Thus, a ticket created on February 1, with the text, "I first saw this error 3 weeks ago," allows document preprocessor 410 to identify that the error began around January 11.

Document preprocessor 410 also performs negation analysis to identify text where a concept is negated. For example, the text, "There was no error last week," is an example of a negation. Here, "error" is a concept; "last week" is temporal and indicates when the error occurred. Negation recognizes the word "no" and given the context, negates the concept to indicate that there was not an error at that time.

Now that the above natural language processing (NLP) stack has executed, document preprocessor 410 performs document similarity matching to determine document similarity. Similar documents have the same key concepts and prevalence of concepts in the same semantic context. Document preprocessor 410 attempts to identify problem reports for the same problem over time. For example, it is likely that user authentication errors will happen regularly. Document preprocessor 410 also attempts to identify similar problem resolutions, because the same resolution may solve many different problems. For example, restarting a node or application on a server may solve multiple issues. Document preprocessor 410 also attempts to identify defects, resolutions, etc. marked as duplicates, defects that are marked as related to other defects, etc. Document preprocessor 410 also looks for issues caused by other fixes. If a new defect is linked to a document resolution as a cause, it must be handled carefully because a fix for an issue might cause other issues. Document preprocessor 410 looks at product details to identify which patches are bundled within new releases of applications running in the environment. If a fix for an issue is to apply a patch, the system may be able to apply a patch automatically, but only if the product version supports it. If the patch is already rolled up into the deployed product version, the system would not attempt to apply the patch.

Once document preprocessor 410 has identified errors that are substantially similar, document preprocessor 410 summarizes the problem description to identify all concepts necessary to identify that issue. For example:

user can log in user is accessing aNode.aServer.ibm.com/anApp user receives a 501 not implemented error code Error "SQL error 30082—SQL30082N Security processing failed with reason "1" visible in db2 log on node aDBNodeaServer.ibm.com Error "anApp failed to communicate with DB aDBNode.aServer.ibm.com" visible in server.log for Apache web server on aNode.aServeribm.com 30 seconds later Document preprocessor 410 associates this summarized error description with the summarized resolution for that error, along with the number of times this solution has been used and its success rate). For example, one resolution report might say, "Changed password on DB2, working fine now," while another may give the description of how the engineer changed the password on DB2. Document preprocessor 410 may identify the steps to change the password on DB2 from a DB2 user manual, which document preprocessor 410, can use to expand the resolution. For example:

SSH to server aDBNode.aServeribm.com

Open DB2 command line processor

Execute command db2 "CONNECT TO <database> USER <userid> USING <password> NEW <new_password> CONFIRM <new_password>"

Finally, document preprocessor 410 identifies people of interest from the processed documents. If the fix involves applying a patch, document preprocessor 410 may include the developers and testers of that patch. Document preprocessor 410 may also include the DevOps engineers who have fixed these issues in the past.

Now that document preprocessor 410 has summarized error descriptions, resolutions, and people of interest, document preprocessor 410 can add those documents to the corpus 420. For a given problem, document preprocessor 410 adds two newly created documents, one for the problem description and one for the resolution. Document preprocessor 410 uses metadata to map the resolution to the problem. Document preprocessor 410 also uses metadata to store the people of interest and a document reference to the original sources of the document content.

In one embodiment, document preprocessor 410 may perform document clustering before adding the documents to corpus 420. This will cluster the documents by topic (the key concepts within the document). This allows the system to cluster database issues together, for example. Document preprocessor 410 can cluster documents to a very fine level. For example, a cluster ID may be associated with a particular node, a particular mirror message, etc. A single document may be associated with any number of cluster IDs. This cluster ID may be used when indexing the documents to improve search performance.

Document preprocessor 420 may index the documents using any document indexing technology, such as Lucene or Apache Solr. This will make the documents searchable. The documents can be structured in such a way as to allow searches for individual error messages, uniform resource locator (URL) references, node name references, etc.

Figures 5, 6, 7:
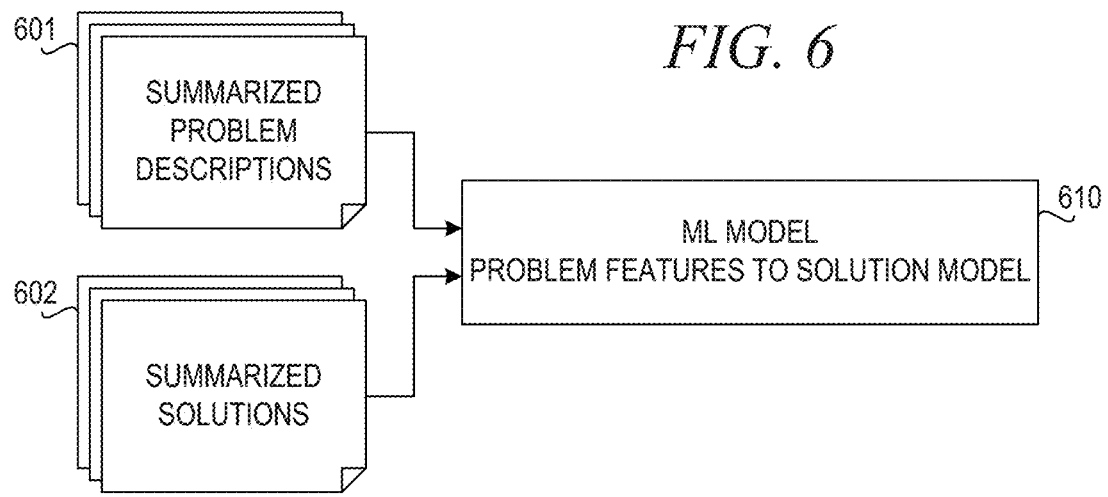
FIG. 5 depicts a table of an index for a document in the corpus in accordance with an illustrative embodiment.
FIG. 6 is a block diagram of a model for problem reports in accordance with an illustrative embodiment.
FIG. 7 depicts an example machine learning matrix showing an outline of features used to train a machine learning model in accordance with an illustrative embodiment.

FIG. 5 depicts a table of an index for a document in the corpus in accordance with an illustrative embodiment. For a given document, in this case document ID 0001, the index stores an error description, log file snippets, resolution text, and interested parties.

FIG. 6 is a block diagram of a model for problem reports in accordance with an illustrative embodiment. Machine learning (ML) model 610 is trained based on summarized problem descriptions 601 and summarized solutions 602. Now that the system has a summarized list of key concepts needed to identify a problem in the environment, the system can use those concepts to create a machine learning model 610 to model those problems. Features of the model will be things like the nodes involved, the error messages returned, the application/system device that triggered the errors, the time span between error messages in different logs on different nodes, whether or not a user could log in, whether or not an application rendered, and so on. The model takes an error input scenario and uses the model 610 to identify potential solution documents. Because there is likely to be a large set of features, it is likely that a number of models would be needed, perhaps each containing features for a particular error type, such as database issues, lightweight directory access protocol (LDAP) issues, etc., as defined in the document clustering step. One likely model breakdown is to identify from Which node the root cause sourced and then to use a node-specific model to identify the root cause.

FIG. 7 depicts an example machine learning matrix showing an outline of features used to train a machine learning model in accordance with an illustrative embodiment. Note that ID 001 and ID 002 represent two different error cases with the same solution. The trained model 610 applies weights to each of the features to determine which features are most important in identifying a problem that corresponds to a given solution. As shown in FIG. 7, for problem ID 0001, the feature "An App" is asserted, while the features "Another App," "A Node," and "An Error" are not asserted. Problem 001 is associated with solution document ID 0010. For problem ID 0002, the feature "Another App" is asserted, while the features "An App," "A Node," and "An Error" are not asserted. Problem 002 is associated with solution document ID 0010.

Many log monitoring tools exist. An agent runs on the nodes within the environment and monitors the log files. The agent notifies an application whenever a log file changes or whenever an error is detected in a log. In accordance with the illustrative embodiment, the log monitoring agent communicates with the system whenever an error message is identified, along with the log name and location, node name and Internet protocol (IP) address, the error message found, the time and date that it was recorded, etc.

In response to the log monitor application is notified of an error, the system attempts to find a matching error. There may be a single error on a single node or many cascading errors across logs throughout the system. The errors that occur, the nodes they occur on, the applications and network devices that generate the logs, the timeframe between the errors, etc. are used as input to the model (or collection of models).

The model, in turn, outputs a number of potential solutions the problem features of which most closely match the error state that, the environment is facing. Each potential solution identified also has a corresponding confidence score representing how likely it is that the solution matches the error scenario. The higher the confidence of an identified solution, the higher the likelihood the solution can be used to automatically resolve the issue. It could also happen that there is not enough information from the system logs alone to identify a solution. In this case, a user error report must be filed in combination with error logs to identify the correct solution to the problem.

Once a set of solutions to the system error are identified, the system can begin to determine the next step. In the simplest scenario, a solution with very high confidence (i.e., greater than a predetermined threshold) and a substantially higher confidence than the other solutions is returned. This solution is the clear winner and the solution the system will use to attempt to resolve the error.

Another simple scenario is that no high confidence solution is returned. In this case, the system does not attempt to automatically resolve the error.

A more complex and more likely example is that multiple high confidence solutions are returned with little difference between the confidence levels. There is a good chance that any one of these solutions is the correct solution, and it is also possible that more than one of the returned solutions would work. In this case, a process of secondary scoring interrogates the contents of the solution to select a solution.

When the system scores the high confidence solutions, the system essentially ranks them in order of most likely to succeed without causing further issues. Some of the key things the system takes into account during scoring are as follows:

The number of times a given solution has been successful in the past.
The likelihood of a solution having knock on effects.
Service interruption and downtime.
The severity of the error within the system (how much risk the system is willing to take will be based on how badly the system is performing). The system would not restart a node to solve a login issue for a single user, but if every user was failing authentication and the node was basically unusable, restarting it can only make things better.

The actual features the system scores on will vary from system to system and node to node. Scoring information for the system may also come in the form of metadata stored with each of the nodes, which is searchable by the application, containing rules such as "Do not auto restart. Must be restarted manually" or "Do not auto apply patches or fixpacks" or "Maintenance window is Sunday from midnight to 2 am" or the like.

It may be that the top returned solution is not the first one that the system tries. For example, if the two solutions being scored are "restart the Web server—85%" and "install fixpack 1 on webserver—90%," it could easily be argued that trying a simple restart of the server is the safest option. If the restart fails, then the system may attempt installing fixpack 1.

The system must be enabled to perform certain operations automatically in order to automatically resolve errors. Because the solution documents contain descriptions of the steps to take to resolve an issue, and not a list of linked operations, the system must turn that text into operations the system can perform. Clearly there are some operations that the system cannot perform. The first step is to identify the operations in the solution document using the same NLP techniques discussed earlier. The proposed solution is to then use a classifier that maps those textual representations of operations to the executable operations the system can perform.

FIG. 8 depicts a table for a classifier in accordance with an illustrative embodiment. The classifier is a fairly simple mechanism to map text strings to a classifier ID. FIG. 9 depicts a table for system operation mappings in accordance with an illustrative embodiment. The system identifies the operations in a solution and uses the classifier to return a classifier ID, which can be mapped to an operation the system can perform. The classifier is manually trained with as many variations of describing an operation as possible; however, it is not necessary to list every possible variation. For example, "Go to node and open a terminal" should still map to operation ID 001 in the example shown in FIG. 8.

The classifier is used to map the text of solution operations to classifier IDs. The classifier IDs in turn map to operations that the system can perform. The output of the classifier, as with the ML models, comes with a confidence level. There is always a possibility of a solution containing commands that the system cannot perform. In such a case, the operation text may have a very low confidence response from the classifier. If the system operations have a high confidence value for the identified operation in the solution document, then the system will identify the solution as a target for automatic execution.

Once there is a high confidence solution and there is a high confidence that the system can automatically perform each step within the solution, the system may then execute the steps.

If there is a solution that the system can execute but there is not a high confidence that the system can automatically perform the operations, then the system may present the solution to a system administrator to let him or her decide whether to or not to let the system execute the solution.

If there is a high confidence solution that the system cannot automatically execute, the system may send the solution document to a system administrator to perform the operations. If there is a defect or a problem report associated with the problem/error, the system can update the defect directly with the recommended solution document.

This classification task can also be included in the secondary scoring mechanism, where if the highest confidence solution is not one that can be performed automatically but the second and third highest are, the system may attempt the second and third highest solutions over the highest solution in an attempt to automatically resolve the issue before handing it over to a human administrator to attempt to resolve.

Each error state that the system encounters and each attempt to resolve it will be logged just like any other environment issue. These in turn will feed back into the system so that the system can continuously learn the best solutions to the system errors it has encountered.

Apart from automatically performing operations, the system may also perform less complex tasks. For example:

Notifying the system administrator of record of errors when they occur.

Notifying the identified interested parties associated with the error or solution. Where more than one system administrator is managing a large distributed infrastructure, this would attempt to only notify the engineer managing the piece of the infrastructure related to the error.

If a defect is fixed in an update to an application but the same error appears again, the system may notify the developers associated with the original fix that it appears to have returned.

If an end user adds a problem report, the system may attempt to identify solutions the end user may be able to do themselves to resolve their issue and email them or add a comment to the defect, etc.

A lot of effort is required to generate the information needed to train the system problems ML model. As part of that work, the system indexes the summarized problems and solutions documents so that they are searchable. This data store may be used as a reference for anybody with access to attempt to identify errors and solutions to problems they are encountering. It is also a resource to see which are the most common errors and solutions within the system, how many times a solution is used, which solutions resolve the largest number of problems, and so on. One can also use this data to help identify the areas of the infrastructure that may need investment.

Figure 10:
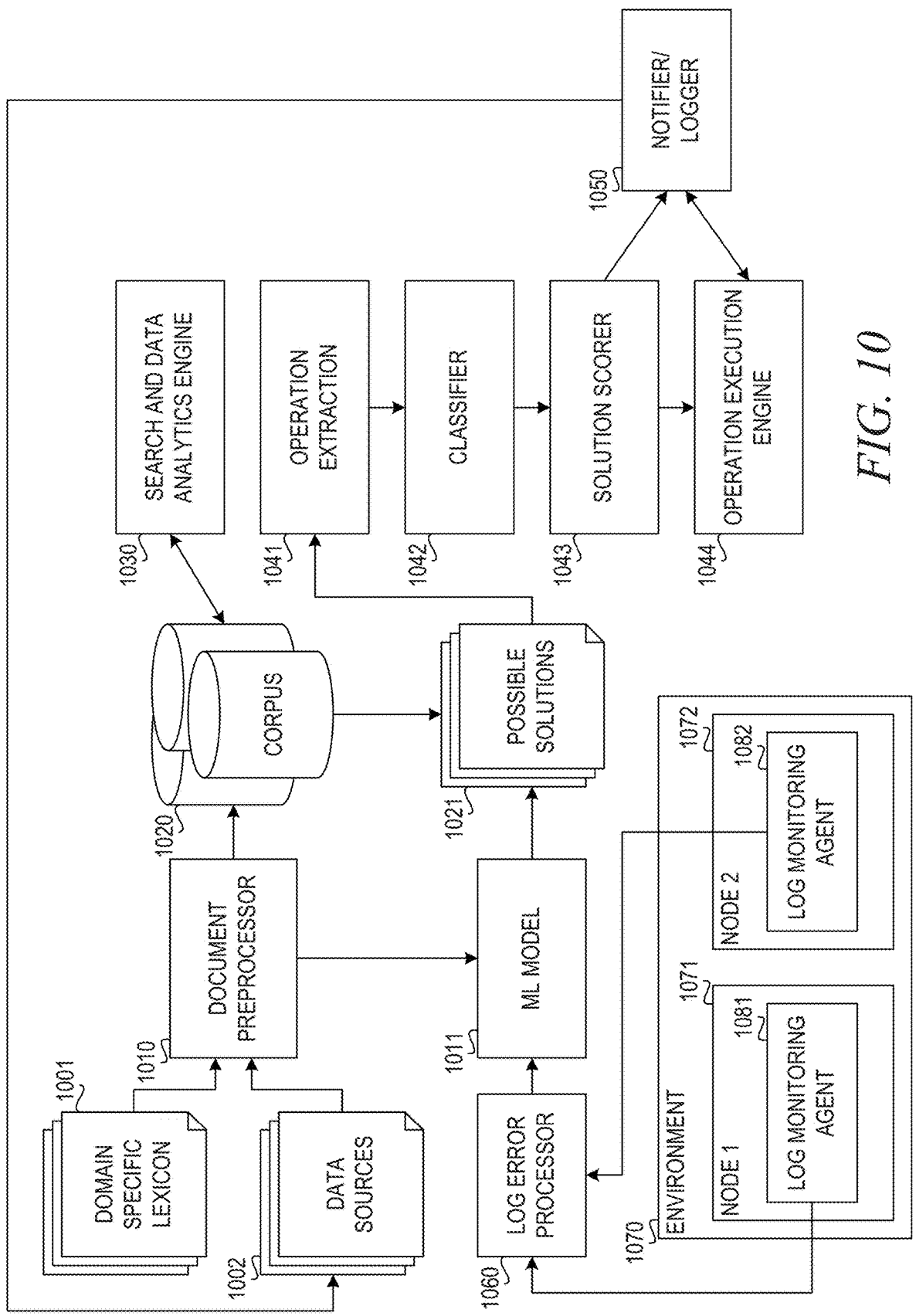
FIG. 10 is a block diagram of an end-to-end system for identifying and resolving issues in a distributed infrastructure using cognitive technologies in accordance with an illustrative embodiment.

FIG. 10 is a block diagram of an end-to-end system for identifying and resolving issues in a distributed infrastructure using cognitive technologies in accordance with an illustrative embodiment. Document preprocessor 1010 receives domain specific lexicon 1001 and data sources 1002. As described above, data sources 1002 may include runbooks, user problem reports, resolution records, error logs, and technical reference material. Document preprocessor 1010 identifies and summarizes problem and solution features. More specifically, as described above, document preprocessor 1010 may perform semantic analysis, query expansion, entity/concept detection, relationship detection, temporal analysis, negation analysis, document similarity matching, summarization, document clustering, and indexing. Document preprocessor 1010 adds documents to corpus 1020. Search and data analytics engine 1030 may access corpus 1020 to use the documents in corpus 1020 as a resource for search and analytics.

Distributed infrastructure environment 1070 includes a plurality of data processing nodes 1071, 1072. In the depicted example, data processing node 1 1071 executes log monitoring agent 1081, and data processing node 2 1072 executes log monitoring agent 1082. In response to an error being added to an error log in node 1 1071, for example, log monitoring agent 1081 notifies log error processor 1060 with the data identifying, for example, the node involved, the error messages returned, the application/system device that triggered the error, etc.

Machine learning (ML) model 1011 receives an error input scenario from tog error processor 1060 and identifies potential solution documents 1021 from corpus 1020. Because there is likely to be a large set of features, there may be a plurality of models 1011. Potential solution documents 1021 may have associated confidence values and may be ranked by confidence value.

Operation extraction component 1041 extracts solution operations from the possible solution documents 1021. Classifier component 1042 classifies the extracted operations to system operations that may be executed by the system. Solution scorer 1043 then scores the solutions based on the confidence of the solution itself and an automatic execution confidence value representing a likelihood the operations can be executed by the system automatically.

Operation execution engine 1044 may then take the system operations and attempts to automatically execute the operations. Operation execution engine 1044 may attempt automatic execution responsive to a candidate solution 1021 having a high confidence and a high automatic execution confidence value. That is, if there is one solution with a high confidence, then operation execution engine 1044 may attempt automatic resolution.

However, if no high confidence solutions are returned, then operation execution engine 1044 would not attempt automatic resolution. Rather, notifier/logger component 1050 notifies persons of interest for the error. Notifier/logger component 1050 may send the solution document to a system administrator.

Furthermore, notifier/logger component 1050 may feed results of automatic resolution by operation execution engine 1044 back into data sources 1002. In this way, document preprocessor 1010 continuously updates the documents in corpus 1020 as errors are encountered and/or resolved.

If multiple high confidence solutions are returned with little difference between the confidence values, then solution scorer 1043 may perform secondary scoring where the contents of the solution are interrogated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 11 is a flowchart illustrating operation of a mechanism for preparing data sources in accordance with an illustrative embodiment. Operation begins (block 1100), and the mechanism receives error log files and/or problem reports (block 1101). Once an issue is resolved, resolution documents are created containing the steps taken to resolve the issue, with the resolution document being linked to the original problem report. The mechanism receives resolution documents (block 1102). Then, the mechanism marks multiple instances of the same issue as duplicates of a single problem report (block 1103). The mechanism links multiple instance of the issue to the problem report (block 1104). Then, the mechanism links the problem reports to other tasks, such as development tasks where a code change is needed to fix an issue, along with the developers involved, the testers who tested the fix, etc. (block 1105). Thereafter, operation ends (block 1106).

Figure 12:
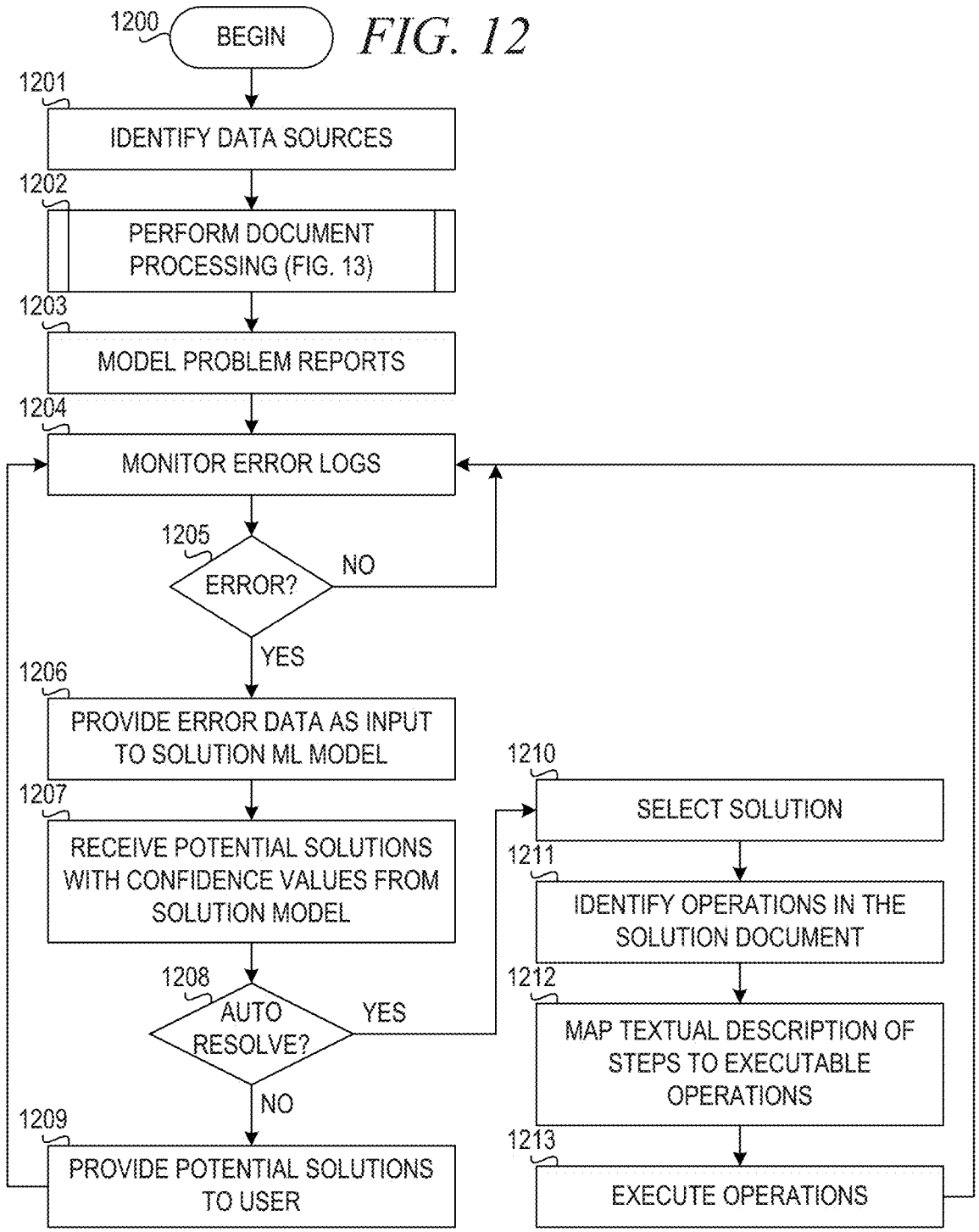
FIG. 12 is a flowchart illustrating operation of a system for identifying and resolving issues in a distributed infrastructure using cognitive technology in accordance with an illustrative embodiment.

FIG. 12 is a flowchart illustrating operation of a system for identifying and resolving issues in a distributed infrastructure using cognitive technology in accordance with an illustrative embodiment. Operation beings (block 1200), and the system identifies data sources (block 1201). The data sources may include problem reports and resolution documents from project management and other systems, runbooks, a document provided by the development team explaining possible errors and corresponding resolutions, and technical documents such as user manuals for the application running in the environment or the servers hosting those applications. This list of data sources is not intended to be limiting, and any number of other data sources may be used within the spirit and scope of the embodiment.

The system then performs document preprocessing (block 1202). The operations of document preprocessing will be described in further detail below with reference to FIG. 13.

Thereafter, the system models the problem reports (block 1203). The features for the footprint of a problem in the system are modeled using a machine learning model. The model will map error scenarios to possible solutions. The features may consist of data points, such as the application an error occurred on, which node it occurred on, the time between errors appearing on different logs in the system, etc. The exact set of features may likely vary depending on the overall architecture and types of servers and applications being used. The goal of the model is to take receive as input an error scenario present in the system and to return a list of potential solution documents along with a confidence of how likely that solution is correct for the given error state. In complex multi-tier environments, the system may end up having multiple models.

The system then determines whether an error is encountered (block 1205). Any log monitoring tool can be used. The log monitoring agent running on the target nodes will communicate with the system after errors are identified, providing information like node name, log name, log location, time of occurrence, etc. There may be a single error on a single node or many cascading errors across logs throughout the system. This data will be used as input to the model (or collection of models). The model returns a number of potential solutions. Each potential solution may have an associated confidence score. Thus, the system provides the error data as input to the solution machine learning (ML) model (block 1206) and receives potential solutions with confidence values from the solution ML model (block 1207).

The system determines whether to automatically resolve the issue (block 1208). In a simple scenario, a solution with very high confidence and a substantially higher confidence than the other solutions is returned. This solution may be used in an attempt to resolve the error automatically. Another simple scenario is that no high confidence solution is returned. In this case, the system would not attempt to automatically resolve the error. A more likely example is that multiple high confidence solutions are returned with little difference between the confidence levels. There is a good chance that one of the solutions is correct or multiple solutions are correct and either will work. In this case, the system may perform secondary scoring where the contents of the solutions are interrogated and the highest scoring solution will be used in an attempt to automatically resolve the error.

In response to the system determining not to automatically resolve the error, the system provides the potential solutions to a user, such as a system administrator (bock 1209). Then, operation returns to block 1204 to monitor the error logs.

In response to the system determining to automatically resolve the error in block 1208, the system selects a solution to execute (block 1210). The system identifies operations in the solution document using the same NLP techniques as the document preprocessor (block 1211). The solution document contains descriptions of the resolution steps and not a list of linked operations. A classifier is used to map the textual descriptions of steps to executable operations the system can perform (block 1212). Once all of the steps in a resolution document have been mapped to operations the system can perform, the system executes the operations automatically (block 1213). Thereafter, operation returns to block 1204 to monitor the error logs.

Figure 13:
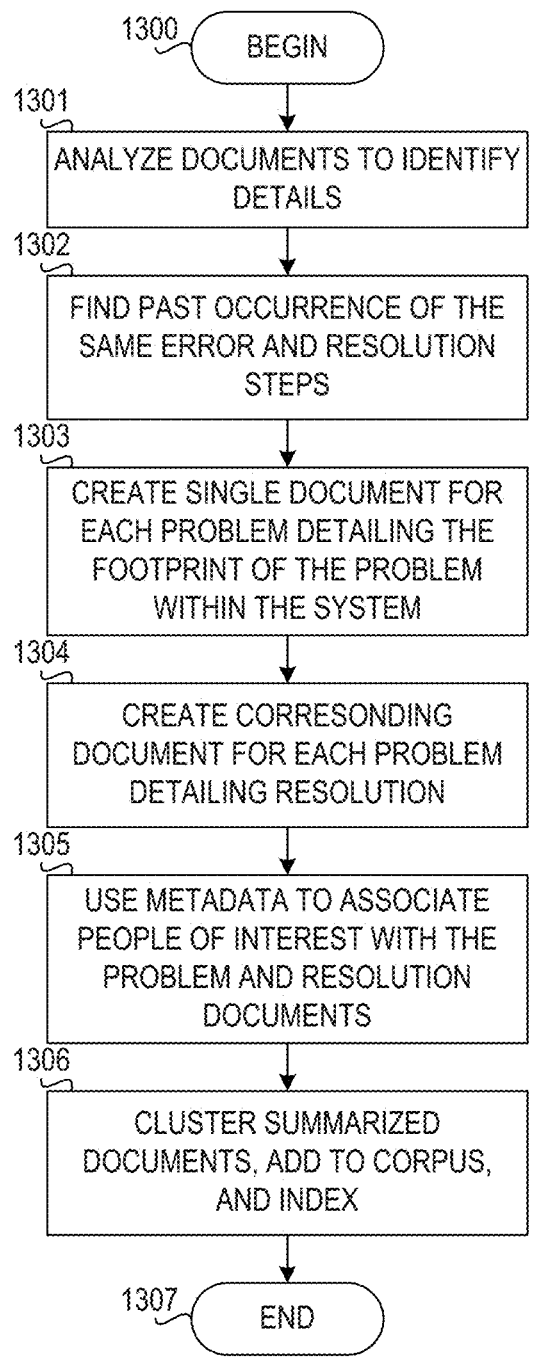
FIG. 13 is a flowchart, illustrating operation of a document preprocessor in accordance with an illustrative embodiment.

FIG. 13 is a flowchart illustrating operation of a document preprocessor in accordance with an illustrative embodiment. Operation begins (block 1300), and the document preprocessor analyzes documents to identify details, such as what server the error occurred on, what date it occurred, what log files can be looked at, and possible root cause (block 1301). The document preprocessor looks for document similarity to find past occurrences of the same error and resolution steps (block 1302). For example, document preprocessor may look for defects, resolutions, people involved, patch details, etc.

The document preprocessor creates a single document for each problem detailing the footprint of the problem within the system (block 1303). The document preprocessor creates a corresponding document for each problem detailing the resolution for that problem (block 1304). The document preprocessor uses metadata to associate people of interest with the problem and resolution documents (block 1305). Then, the document preprocessor clusters the summarized documents, adds them to the corpus, and indexes the documents using search technologies (block 1306). Thereafter, operation ends (block 1307).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or early out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and a memory comprising instructions, for identifying and resolving issues in a distributed infrastructure, the method comprising:
    configuring the memory with instructions, which are executed by the at least one processor and configure the at least one processor to implement a log error processor, a machine learning model, an operation extraction component, a classifier component, a solution scorer component, and an operation execution engine;
    monitoring, by the log error processor, error logs of a plurality of data processing nodes within the distributed infrastructure;
    in response to the log error processor detecting an error in a given node within the distributed infrastructure, providing error data for the error to the machine learning model and receiving from the machine learning model a set of potential solutions and associated confidence values;
    extracting, by the operation extraction component from each potential solution in the set of potential solutions, a set of operations to resolve the error;
    mapping, by the classifier component, each set, of operations to a set of executable operations that are executable by the given node;
    determining, by the solution scorer component, whether to perform automatic resolution using a selected potential solution and its corresponding set of executable operations; and
    in response to the solution scorer component determining to perform automatic resolution, executing, by the operation execution engine, the corresponding set of executable operations on the given node.

2. The method of claim 1, wherein monitoring error logs comprises communicating with a plurality of log monitoring agents executing on data processing nodes within the distributed infrastructure.

3. The method of claim 1, wherein the error data comprises at least one of an application the error occurred on, a data processing node the error occurred on, or a time between errors appearing in different logs in the distributed infrastructure.

4. The method of claim 1, wherein the set of potential solutions comprises a of solution documents and wherein extracting the set of operations from a given solution document comprises performing natural language on the given solution document.

5. The method of claim 1, wherein the machine learning model is one of a plurality of machine learning models, wherein each machine learning model corresponds to a respective error type.

6. The method of claim 1, further comprising:
    configuring the memory with, instructions, which are executed by the at least one processor and configure the at least one processor to implement a document preprocessor;
    receiving, by the document preprocessor, a plurality of data sources including user problem reports and resolution records;
    performing, by the document preprocessor, preprocessing on the plurality of data sources to create a document for each problem detailing a footprint of the problem within the distributed infrastructure to create a corresponding problem document for each problem detailing a resolution of the problem;

creating, by the document preprocessor, a resolution document for each problem document detailing a resolution for the respective problem; and storing, by the document preprocessor, each problem document and each resolution document in a corpus of documents.

7. The method of claim 6, wherein preprocessing comprises at least one of:
semantic analysis;
query expansion;
entity/concept detection;
relationship detection;
temporal analysis;
negation, analysis;
document similarity matching;
summarization;
document clustering; or
indexing.

8. The method of claim 6, wherein the plurality of data sources comprises documents provided by a development team of an application running within the distributed infrastructure describing potential errors and their associated solutions.

9. The method of claim 6, wherein the plurality of data sources comprises technical documents.

10. The method of claim 1, further comprising:
in response to the solution scorer component determining not to perform automatic resolution, presenting, by the notifier/logger component executing on the at least one processor of the data processing system, the set of potential solutions to a system administrator.

11. A computer program product comprising a non-transitory computer readable storage medium having a computer readable program stored therein, wherein the computer readable program, when executed on at least one processor of a data processing system, causes the data processing system to implement a log error processor, a machine learning model, an operation extraction component, a classifier component, a solution scorer component, and an operation execution engine, wherein the computer readable program causes the data processing system to:
monitor, by the log error processor, error logs of a plurality of data processing nodes within the distributed infrastructure;
in response to the log error processor detecting an error in a given node within the distributed infrastructure, provide error data for the error to the machine learning model and receiving from the machine learning model a set of potential solutions and associated confidence values;
extract, by the operation extraction component from each potential solution in the set of potential solutions, a set of operations, to resolve the error;
map, by the classifier component, each set of operations to a set of executable operations that are executable by the given node;
determine, by the solution scorer component, whether to perform automatic resolution using a selected potential solution and its corresponding set of executable operations; and
in response to the solution scorer component determining to perform automatic; resolution, execute, by the operation execution engine, the corresponding set of executable operations on the given node.

12. The computer program product of claim 11, wherein monitoring error logs comprises communicating with a plurality of log monitoring agents executing on data processing nodes within the distributed infrastructure.

13. The computer program product of claim 11, wherein the error data comprises at least one of an application the error occurred on, a data processing node the error occurred on, or a time between errors appearing indifferent logs in the distributed infrastructure.

14. The computer program product of claim 11, wherein the set of potential solutions comprises a set of solution documents and wherein extracting the set of operations from a given solution document comprises performing natural language on the given solution document.

15. The computer program product of claim 11, wherein the machine learning model is one of a plurality of machine learning models, wherein each machine learning model corresponds to a respective error type.

16. The computer program product of claim 11, wherein the computer readable program causes the data processing system to implement a document preprocessor, wherein the computer readable program further causes the data processing system to:
receive, by the document preprocessor, a plurality of data sources including user problem reports and resolution records;
perform, by the document preprocessor, preprocessing on the plurality of data sources to create a document for each problem detailing a footprint of the problem within the distributed infrastructure to create a corresponding problem document for each problem detailing a resolution of the problem;
create, by the document preprocessor, a resolution document each problem document detailing a resolution for the respective problem; and
store, by the document preprocessor, each problem document and each resolution document in a corpus of documents.

17. The computer program product of claim 16, wherein preprocessing comprises at least one of:
semantic analysis;
query expansion;
entity/concept detection;
relationship detection;
temporal analysis;
negation analysis;
document similarity matching;
summarization;
document clustering; or
indexing.

18. The computer program product of claim 16, wherein the plurality of data sources comprises documents provided by a development team of an application running within the distributed infrastructure describing potential errors and their associated solutions.

19. The computer program product of claim 1, wherein the computer readable program further causes the data processing system to:
in response to the solution scorer component determining not to perform automatic resolution, presenting, by the nether/logger component executing on the at least one processor of the data processing system, the set of potential solutions to a system administrator.

20. An apparatus comprising:
a processor; and
a memory coupled to the processor, wherein the memory comprises instructions which, when executed by the processor, cause the processor to implement a log error processor, a machine learning model, an operation extraction component, a classifier component, a solution scorer component, and an operation execution engine, wherein the instructions cause the processor to:

monitor, by the log error processor, error logs of a plurality of data processing nodes within the distributed infrastructure;

in response to the log error processor detecting an error in a given node within the distributed infrastructure, provide error data for the error to the machine learning model and receiving from the machine learning model a set of potential solutions and associated confidence values;

extract, by the operation extraction component from each potential solution in the set of potential solutions, a set of operations to resolve the error;

map, by the classifier component, each set of operations to a set of exec operations that are executable by the given node;

determine, by the solution scorer component, whether to perform automatic resolution using a selected potential solution and its corresponding set of executable operations; and in response to the solution scorer component determining to perform automatic resolution, execute, by the operation execution engine, the corresponding set of executable operations on the given node.

* * * * *